United States Patent [19]

Pappas et al.

[11] 4,126,772

[45] Nov. 21, 1978

[54] SWITCH FOR DETECTING TIRE PRESSURE

[75] Inventors: Dennis G. Pappas, 200 E. 58th St., New York, N.Y. 10022; Matthew C. Baum, Westwood, N.J.; Samuel N. Small, Valley Stream, N.Y.; Robert T. Adams, Short Hills, N.J.; Robert P. Freedman, East Northport, N.Y.

[73] Assignee: Dennis G. Pappas, New York, N.Y.

[21] Appl. No.: 719,325

[22] Filed: Aug. 31, 1976

[51] Int. Cl.² .................................................. H01H 35/24
[52] U.S. Cl. .................................. 200/61.25; 200/83 R
[58] Field of Search ............... 200/61.25, 153 L, 83 R; 340/58

[56] References Cited

U.S. PATENT DOCUMENTS

| 3,575,563 | 4/1971 | Russell | 200/153 L X |
| 3,743,801 | 7/1973 | Brobeck et al. | 200/61.25 |
| 3,889,077 | 6/1975 | Hayashi | 200/61.25 |
| 3,938,076 | 2/1976 | Hayashi | 200/61.25 X |
| 3,963,887 | 6/1976 | Takusagawa et al. | 200/61.25 X |
| 3,985,984 | 10/1976 | Cappa | 200/61.25 |
| 4,006,327 | 2/1977 | Hayashi et al. | 200/61.25 |

Primary Examiner—James R. Scott

[57] ABSTRACT

A vehicle tire gas mass sensor having a sealed cylinder containing a non-toxic and inert gas. The cylinder is sealed at one end with a diaphragm and contains a sealable plug at an opposite end for admitting the inert gas. Sealing is permanent after the introduction of gas. The diaphragm moves freely in response to pressure differential between the inside predetermined pressure of the inert gas and pressure existing in the environment in which sensor is installed. The sensor is defined by a first, second and third contacts which are responsive to diaphragm movement caused by pressure differentials in the cylinder. In turn opening and closing of the contacts actuates alarms for indicating such pressure differential. Equilibrium conditions as between the interior and environment of the sensor are reflected by the movement of diaphragm to compensate for temperature variation occurring at these locations.

9 Claims, 3 Drawing Figures

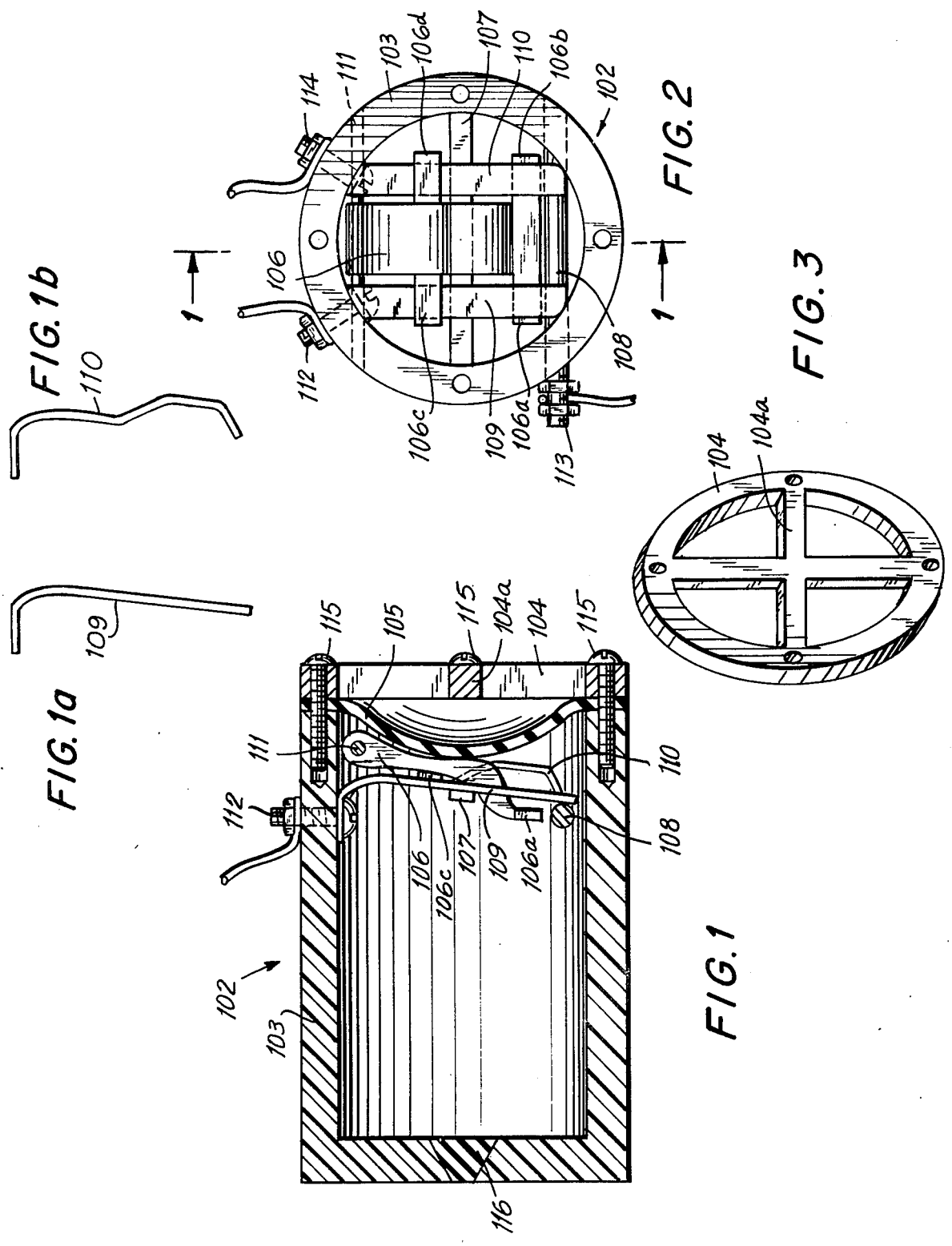

SWITCH FOR DETECTING TIRE PRESSURE

BACKGROUND OF THE INVENTION

The invention relates to a low tire pressure alarm system for vehicles such as trucks and cars to prevent accidents due to tire rupture or dangerously reduced tire pressures.

The system monitors tire pressure, actually air mass, in each of basically four active tires of a vehicle on a continuing basis. Each wheel has a self-contined unit including an air-mass or pressure sensor, cooperating with a power generator, and a transmitter, all integrated into a single easily insertable and replaceable unit.

Information furnished by the wheel units is transmitted to a common receiver when the vehicle is moving, which displays an "O.K." indication when all signals are received as normal; or a warning condition, e.g., with a flashing light; and an alarm if there is a failure in any of the wheels.

In addition to the basic two-level alarm capability to detect incipient failure, the system is also capable of providing individual indication of the tires to identify which one of them might fail or has already lost pressure or gas mass.

The present system is completely fail-safe. Failure of any transmitter of the wheel units triggers the alarm system, except when the vehicle is at a standstill, so that accidents can be prevented under all operating and weather conditions.

The sensor, is fastened to the inner periphery wall of the tire or alternatively to the outer rim of the steel wheel.

Tire inflation monitors have been known before, but they failed in one or more respects, so that the present invention is considered to constitute a major breakthrough and improvement over all hitherto known and used systems. There have been monitors that are locally applied to the wheels, however, there being no temperature evaluation devices for considering the temperature variations within the tire thus reflecting inaccurate pressure differentials.

While the scope of the desired patent protection will be defined later on in this application, the major inventive features are being set out here. First, it is important that air mass rather than pressure is used as an actuating agent in the sensors of the wheel units. No springs are used, and there is no inherent mechanical or other sluggishness. Since the air inside the device tends to have the same temperature as the air outside the device, the effect of temperature on pressure is substantially eliminated. This means that the inventive pressure or actuating mass sensor is completely compensated for cold days, hot days, hard running conditions, and the like outside influences.

Climatic conditions within the tire cavities are rather strenuous, such as water, ice, graphite, talcum powder, other agents, and primarily humidity. In the inventive sensor, everything takes place within a sealed cartridge. The mechanism cannot freeze, the electrical contacts cannot corrode, because the sealed sensor cartridge may contain dry air, nitrogen, or some other inert gas. The only moving part exposed to the outside is a flexible diaphragm that cannot be prevented from its relatively small motion by poor climatic conditions.

It is important to note that centrifugal forces arising from tire rotation have absolutely no effect on the measuring forces, the structural and directional arrangement being such that the relatively small mass and movemments are not affected by such outside forces.

SUMMARY OF THE INVENTION

The main object of the present invention is to provide a sensor apparatus which employs a diaphragm responsive to an air mass volume to detect leakage.

A further object of the present invention is to provide a sensor apparatus formed of a cylinder with inert gas and employing contact members responsive to diaphragm movement in the sensor for actuating warning means indicating a pressure differential between the interior and exterior of the diaphragm.

According to another important feature, the pressure sensor, is symmetrically disposed with associated equipment, as mentioned above, for proper weight distribution, and to lessen the load on each of these areas.

Other objects, inventive features, and advantages, will become readily understood by following the description that follows having reference to the accompanying drawings, wherein In The Drawings FIG. 1 is a longitudinal section through the sensor according to the invention, taken along line 1—1 of FIG. 2;

FIG. 1a is a sectional view of one contact shown in FIG. 5.

FIG. 1b is a sectional view of a second contact shown in FIG. 5.

FIG. 2 is an end view of a sensor of FIG. 1 with the diaphragm and retaining ring removed;

FIG. 3 is a perspective view of the clamping ring of the sensor unit;

DESCRIPTION OF THE INVENTION

FIGS. 1, 2 and 3 illustrate a pressure or air-mass sensor unit that is installed within each wheel, preferably attached to an associated electrical circuit (not shown) for indicating a warning. The sensor is generally designated 102 where compressed gas is introduced into plastic housing 103 through a filler hole or the like, located in the bottom wall of housing 103. The hole is closed by a suitable plug 116. When the air pressure within the cavity reaches a predetermined value, the hole 116 is permanently sealed such as with epoxy cement or the like. The opposite end of the housing 103 is sealed off by an impermeable, preferably silicone-rubber diaphragm 105 which is clamped by a ring 104 with appropriate screws 115 to form an air-tight seal with the housing 103. The ring is formed with a retaining cross 104A to retain the diaphragm 105 against excessive outward flexure under force of the compressed gas in the housing 103 while leaving the diaphragm free to be acted upon by internal tire pressure, as will become clear as this description proceeds.

The diaphragm 105 can flex back and forth depending on the relative pressures exerted on either side of it, namely by the compressed gas within the housing 103 or by the air within tire cavity surrounding the sensor 102. If the pressure on the inside of the sensor is higher than that outside, the diaphragm 105 will tend to bulge outwards and vice versa.

An actuating lever 106 of non-electric material is bonded to the diaphragm 105, preferably in its center along the area of contact shown in FIG. 1, so that it is constrained to move exactly as the center of the diaphragm moves. The lever 106 is pivotably supported by a pin 111 or the like, extended between the side walls of the housing 103 so as to be leak-proof. The lever 106 has two lateral extensions 106a and 106b, at its free end, which are used to engage corresponding areas of electrical contacts 109 and 110 respectively. These two contacts are fastened to the housing 103 by means of connecting screws 112 and 114, and the former being visible in FIG. 1. Lhese screws, although air-tight, provide electrical connection to and from the contacts 109, 110 in conjunction with a common ground wire to be described hereunder.

Both contacts 109 and 110 are flexible and normally in electrical contact with a contact bar 108 extended between the sides of the housing with one end extended outside the housing and terminating in a contact post 113 (see FIG. 2). In normal operation, both circuits are completed or closed. When the diaphragm is pushed inward, to the left as shown in FIG. 1, because the air within the tire is sufficiently pressurized, contact will be made between contact bar 108 on the one hand, and both of the contacts 109, 110, on the other, to indicate a predetermined pressure condition.

When the internal tire pressure drops, the diaphragm 105 moves outward, pulling lever 106 with it. When the lateral extension 106a engages the contact 109 it moves the contact out of touch with contact bar 108, thus breaking the first circuit, to give a "warning" signal.

If the tire pressure continues to fall, the extent of the movement of the lever increases, and now the extension 106b hits the contact 110, which is sufficiently bent to be engaged at a later point in the movement of the lever 106 than the extension engages the contact 109. When the extension 106b engages the contact 110, it is lifted off the contact bar 108 breaking the second circuit to sound a "danger" signal. It will thus be understood that a two-level contact arrangement is provided, the movement of the diaphragm outward under decreasing tire pressure as viewed in FIG. 1, interrupting first the circuit of contact 109, and then the circuit of contact 110, in both instances with respect to the contact bar 108, which will first give the "warning" signal to indicate something is going wrong with tire pressure, and finally a "danger" singal as a final admonition that tire pressure must be corrected to avoid an accident. When more air is put into the tire, the diaphragm 105 and lever 106 return to normal, and contacts 109 and 110 move back into engagement with the contact bar 108.

The sensor 102 also has a means to indicate when the tire is over-inflated to sound a "danger" signal. Extended between the side walls of the housing 103 is a stop 107 of non-electric material. Under normal tire pressure, the contacts 109 and 110 rest on the stop 107 and on the contact bar 108 as shown in FIG. 1. The lever 106 is provided with a second set of lateral extensions 106c and 106d. These extensions 106c and 106d, under normal inflation of the tire, merely engage the contacts 109 and 110 on the face opposite the face that will be engaged by the contacts 106a and 106b upon outward movement of the diaphragm 105 and lever 106 and substantially midway between the stop 107 and the pivot pin 11.

When over-inflation of the tire occurs with the parts in the normal position shown in FIG. 1, the diaphragm 105 and the lever 106 move inward. Immediately, the lateral extensions 106c and 106d push on the contacts 109 and 110 and flex them in unison about the adjacent corner of the stop 107. This flexing causes the free ends of the contacts 109 and 110 to move out of contact with the contact bar 108 breaking the two circuits, and causing the "warning" alarm to be initiated. When the internal pressure of the tire is reduced to normal, the diaphragm 105 and lever 106 move outward permitting the contacts 109 and 110 to flex back to their normal positions in engagement with the contact bar 108.

The stop 107 also serves to prevent excessive movement of the contacts 109 and 110, the lever 106 and the diaphragm 105 under excessive tire pressure.

It will be seen that the electrical terminal 112 has a wire attached to it, the terminals 113 and 114 also having respective wires. The connection of these wires are to other cooperating structure (not shown) with which the invention operates.

The air mass sensor 102 is mounted within the tire to counteract the gravity forces exerted by the rotation of the tire.

Temperature variations within the confines of the tire are compensated by the gas mass within the sensor 102. Obviously, the temperature conditions existing external to the sensor and within the confines of the tire would almost equal the temperature conditions within the sensor. Therefore pressure variations corresponding to temperature conditions are almost identical within the confines of the tire and the internal air mass of the sensor It will be understood by those skilled in the art that the present, rather sophisticated invention admits of various modifications, changes, simplifications, and additions which are all considered to be within the scope of the basic inventive concept. Several modifications, additions, changes, and combinations are possible, as have been indicated and described in several respects, while the illustrated and described embodiments are considered to be nearly preferred, exemplary embodiments. The desired scope of protection should not be construed as being limited by the preferred embodiments, and similarly some of the more sophisticated logic may be omitted in some applications.

We claim:

1. An air mass sensor apparatus for installation within a pressurized tire interior, said sensor being defined by an air tight housing for receiving an inert gas, said housing being sealed at one end and an impermeable diaphragm at an opposite end, barrier means disposed in proximity to said diaphragm, said diaphragm being responsive to a pressure differential formed at either side thereof, pivotally mounted actuating means (106) affixed to said diaphragm within said housing; first contact means (106a, 106b) extending from said actuating means (106) disposed in electrical circuit relation to second contract (109, 110) means having associated connectors external of said housing; and a connecting member (108) disposed in said housing being in electrical circuit relation to said second contract means (109, 110), said connecting member (108) being extendable beyond said housing, said connecting member being responsive to movement of said diaphragm inwardly and outwardly of said housing to cause said second circuit means to make and break an electrical circuit through movement of said actuating means.

2. An apparatus as claimed in claim 1, wherein: said diaphragm being formed of silicone rubber.

3. An apparatus as claimed in claim 1, wherein: said actuating means is contained to said diaphragm moving exactly as said diaphragm moves.

4. An apparatus as claimed in claim 1, wherein: said first contact means being defined by a pair of lateral extensions formed at a free end of said actuating means for engagement with said second contact means.

5. An apparatus as claimed in claim 1, wherein: said contact means being formed of two individual flexible contact members in electrical circuit relation with said connecting member.

6. An apparatus as claimed in claim 1, wherein: said first contact means being adapted to de-energize said second contact means in response to continued outward and inward movement of said diaphragm through corresponding movement of said actuating means, causing contact between said connecting member and said second contact means to respectively become disengaged and engaged responsive to pressure differential in said tire environment and said sensor.

7. An apparatus as claimed in claim 1, wherein: said stop means disposed within said housing for receiving said second contact means adapted to prevent excessive movement of said second contact means in response to excessive inward movement of said diaphragm and said actuating means.

8. An apparatus as claimed in claim 4, wherein: said actuating means having a second pair of lateral extensions disposed within said housing for engagement with said second contact means on a surface thereof opposite to that where said first contact means is in circuit relation to said second contact means, said second pair of lateral extensions being responsive to excessive inward movement of said diaphragm for urging disengagement of said second contact means from said connecting member.

9. An apparatus as claimed in claim 7, wherein: said second contact means being flexibly movable about said stop means.

* * * * *